(12) United States Patent
Yamakawa

(10) Patent No.: US 8,238,053 B2
(45) Date of Patent: Aug. 7, 2012

(54) ROBOT HAND AND LIBRARY DEVICE

(75) Inventor: Kengo Yamakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/236,868

(22) Filed: Sep. 20, 2011

(65) Prior Publication Data

US 2012/0007376 A1    Jan. 12, 2012

Related U.S. Application Data

(63) Continuation of application No. PCT/JP2009/056303, filed on Mar. 27, 2009.

(51) Int. Cl.
*G11B 15/68* (2006.01)
(52) U.S. Cl. ............ 360/92.1; 360/93; 294/106
(58) Field of Classification Search ............ 294/106; 360/92.1, 93, 98.06
See application file for complete search history.

(56) References Cited

U.S. PATENT DOCUMENTS

| | | | | |
|---|---|---|---|---|
| 5,402,283 A | * | 3/1995 | Yamakawa et al. | 360/92.1 |
| 5,450,391 A | * | 9/1995 | Pollard | 369/30.43 |
| 5,487,579 A | * | 1/1996 | Woodruff | 294/115 |
| 5,781,517 A | * | 7/1998 | Nakajima | 369/30.43 |
| 6,532,203 B1 | * | 3/2003 | Pollard | 720/707 |
| 7,193,810 B2 | * | 3/2007 | Dickey et al. | 360/92.1 |
| 7,212,375 B2 | * | 5/2007 | Dickey et | 360/96.4 |
| 2004/0012878 A1 | | 1/2004 | Yamakawa et al. | |
| 2005/0036231 A1 | * | 2/2005 | Dickey et al. | 360/92 |

FOREIGN PATENT DOCUMENTS

| | | |
|---|---|---|
| JP | 2-185755 | 7/1990 |
| JP | 8-127402 | 5/1996 |
| JP | 2004-54970 | 2/2004 |

OTHER PUBLICATIONS

International Search Report for PCT/JP2009/056303, mailed Apr. 21, 2009.

* cited by examiner

*Primary Examiner* — Charles A Fox
(74) *Attorney, Agent, or Firm* — Staas & Halsey LLP

(57) ABSTRACT

A robot hand includes: a drive source; a baseboard; a housing that is capable of advancing and retreating on the baseboard by means of the drive source; a pair of hands that are provided to grasp an object and held by the housing; an operation body that is provided to be capable of being pushed by the object and is held by the housing; and a close mechanism that changes a state of the hands from a non-grasping state where the hands release the object into a grasping state where the hands grasp the object, in response to pushing of the operation body, and that is held by the housing.

8 Claims, 26 Drawing Sheets

US 8,238,053 B2

ROBOT HAND AND LIBRARY DEVICE

CROSS-REFERENCE TO RELATED APPLICATIONS

This application is a continuation application of PCT/JP2009/056303, filed on Mar. 27, 2009, the entire contents of which are incorporated herein by reference.

FIELD

The embodiments discussed herein are related to a robot hand and a library device.

BACKGROUND

There is known a library device for selecting a given storage medium from housed plural storage media and reproduced the given storage medium (Japanese Patent Application Publication No. 2004-54970). The library device is equipped with a transportation mechanism for transporting the selected storage medium to a reproducing device. Such a transportation mechanism is equipped with a robot hand for taking out the storage medium from a storage rack. The robot hand is equipped with a pair of hands for grasping the storage medium.

There is a robot hand for performing a grasping operation by abutting the robot hand with the storage rack. In such a robot hand, for example, even if there is no object to be grasped on the storage rack, the robot hand abuts the storage rack to be in a grasping state. Though there is no object to be grasped in such a way, the hands might be in the grasping state caused by malfunction or the like. Thus, the robot hand in this state may not take out the storage medium from the storage rack.

SUMMARY

According to an aspect of the embodiments, a robot hand includes: a drive source; a baseboard; a housing that is capable of advancing and retreating on the baseboard by means of the drive source; a pair of hands that are provided to grasp an object and held by the housing; an operation body that is provided to be capable of being pushed by the object and is held by the housing; and a close mechanism that changes a state of the hands from a non-grasping state where the hands release the object into a grasping state where the hands grasp the object, in response to pushing of the operation body, and that is held by the housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
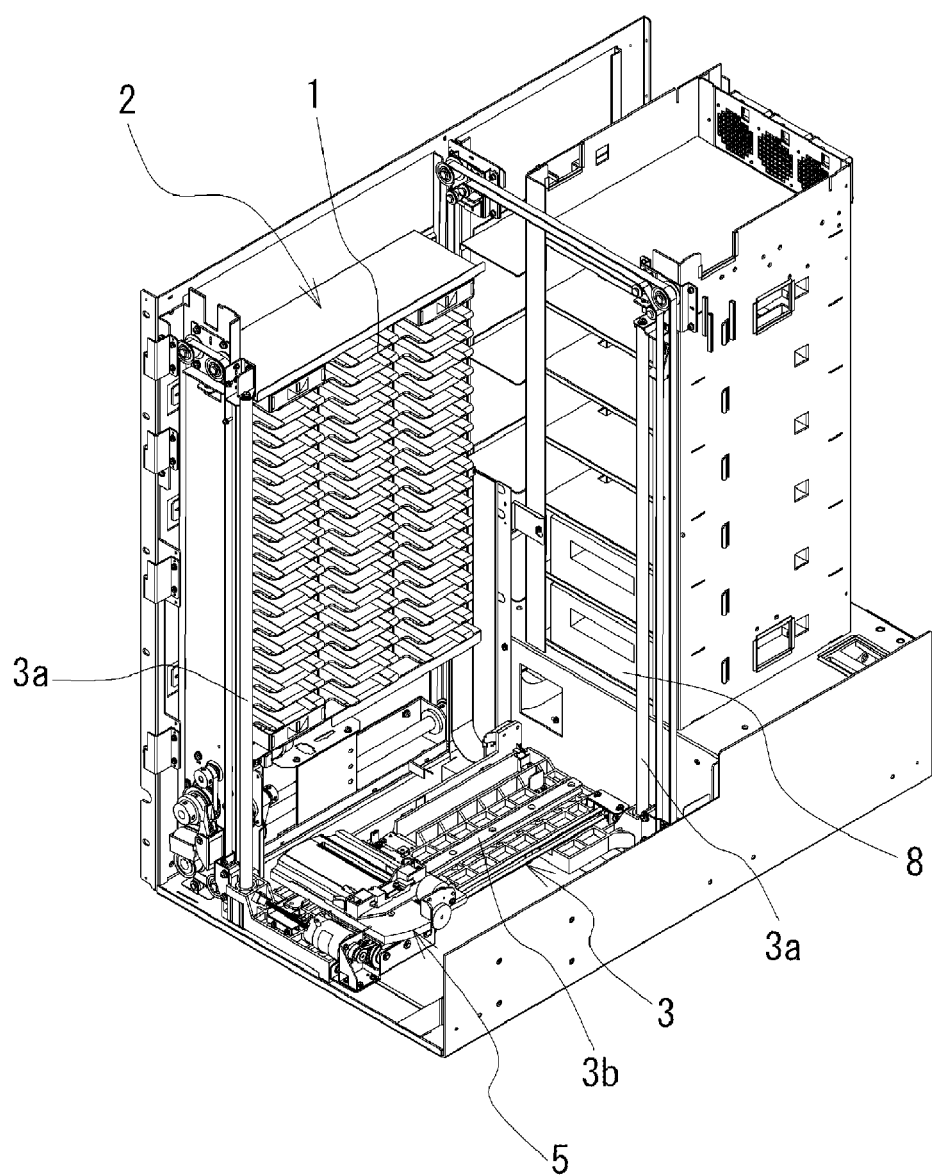
FIG. 1 is an explanatory view of an internal structure of a library device.

FIG. 1 is an explanatory view of an internal structure of a library device. The library device includes: plural storage media 1; a rack 2 accommodating the plural storage media 1; and a reproducing device 8 reproducing the storage medium 1. The storage medium 1 is, for example, a magnetic disk, a magnetic tape cartridge or the like. However, the storage medium 1 may be reproducible any other than them. Also, the library device includes a transportation device 3 which is guided upwardly and downwardly by two guide bars 3a. The transportation device 3 is equipped with a robot hand 5. The transportation device 3 is provided with a rail 3b for guiding the robot hand 5 for a horizontal movement. The transportation device 3 moves upwardly to the position of a given storage medium 1, and then the robot hand 5 moves horizontally to grasp the storage medium 1 at an arbitrary position. The transportation device 3 transports the storage medium 1 grasped by the robot hand 5 to the reproducing device 8.

Figure 2A:
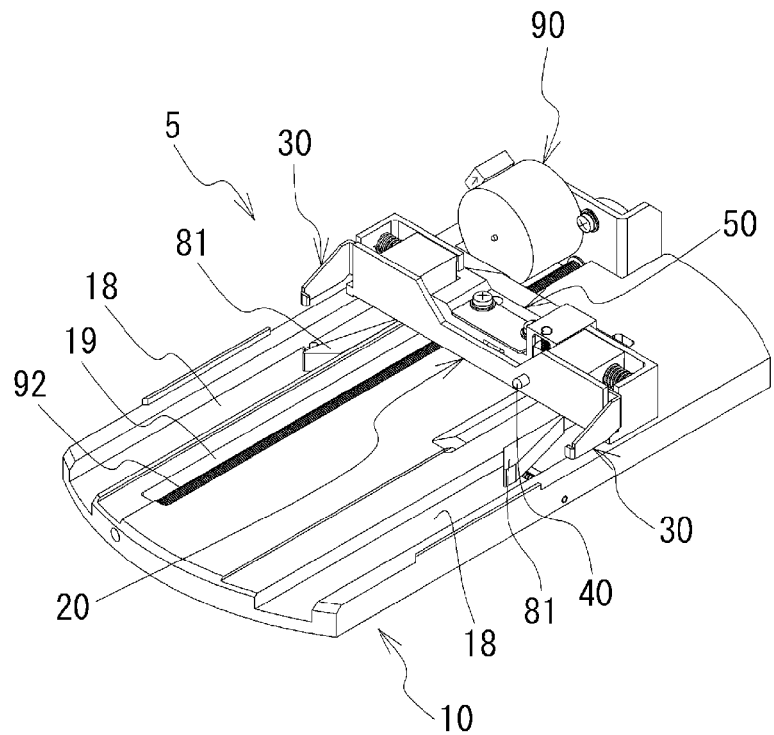
FIG. 2A is an explanatory view of a robot hand.

Next, the robot hand 5 will be described. FIG. 2A is an explanatory view of the robot hand 5. The robot hand 5 includes: a baseboard 10; a housing 20; a pair of hands 30; an operation body 40; a lock member 50; and a drive source 90. The housing 20 is made to advance and retreat on the baseboard 10 by the drive source 90. The hands 30 are provided to be capable of grasping the object and held by the housing 20. The operation body 40 is held by the housing 20 so that the storage medium 1 may push the operation body 40. Also, the robot hand 5 includes a close mechanism which changes the hands 30 from a non-grasping state where the hands 30 release the storage medium 1 into a grasping state where the hands 30 grasp the storage medium 1, in response to pushing of the operation body. The robot hand 5 is held by the housing 20. The lock member 50 is an example according to the close mechanism. A state where the hands 30 grasps the storage medium 1 is referred to as grasping state. A state where the hands 30 release the storage medium 1 is referred to as non-grasping state.

A screw 92 is rotated by the power of the drive source 90. The screw 92 is rotatably supported within an accommodation hole 19 of the baseboard 10. The screw 92 is formed on its circumference with a spiral-shaped groove. The housing 20 is formed at its bottom surface with a hole (not illustrated) to threadedly engage the screw 92. When the screw 92 rotates, the housing 20 moves forwardly and rearwardly.

Figure 2B:
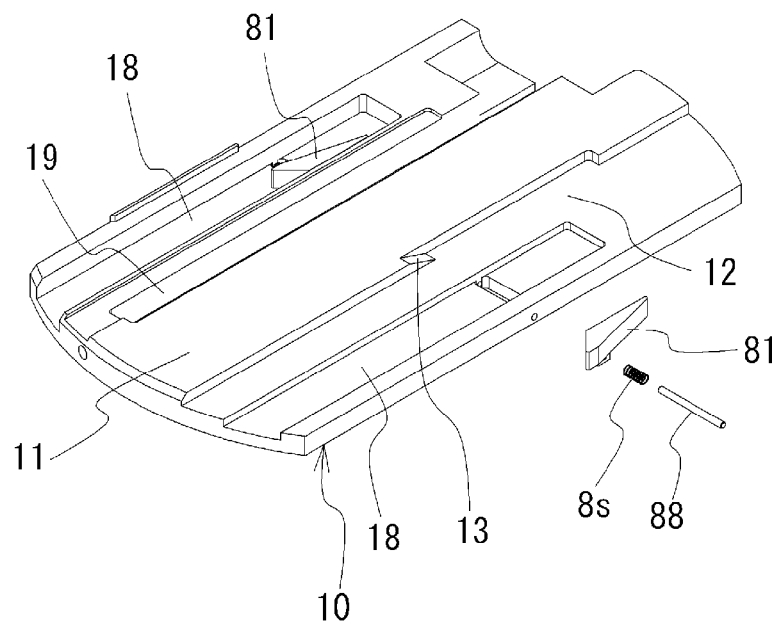
FIG. 2B is an explanatory view of a baseboard.

Next, the baseboard 10 will be described. FIG. 2B is an explanatory view of the baseboard 10. The baseboard 10 is formed at its surface with: sliding surfaces 11 and 12; an inclined surface 13 connecting the sliding surfaces 11 and 12 to each other; and grooves 18. There is a difference in height between the sliding surfaces 11 and 12. The sliding surface 11 is higher than the sliding surface 12. The housing 20 slides over the sliding surface 11. Release bodies 81 are installed into the grooves 18, respectively. The release body 81 is biased toward the inside of the groove 18 by a spring 8s into which a pin 88 is inserted. The release bodies 81 will be described later. The grooves 18 extends in the advancing or retreating directions of the housing 20.

Figure 3A:
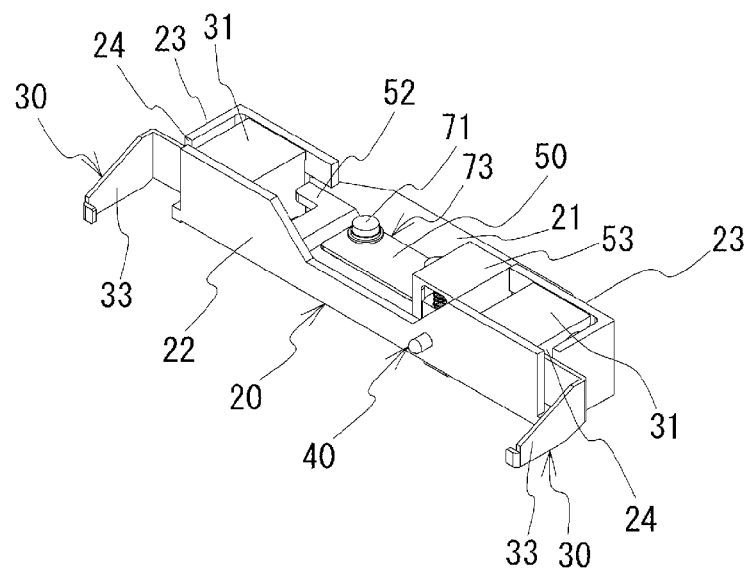
FIGS. 3A and 3B are explanatory views of each member.
Figure 3B:
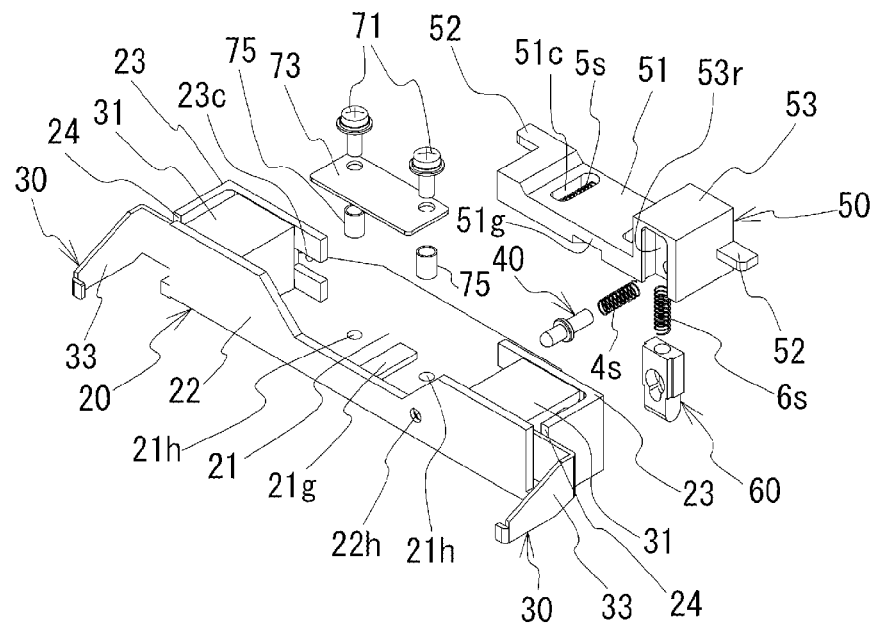
Figure 4A:
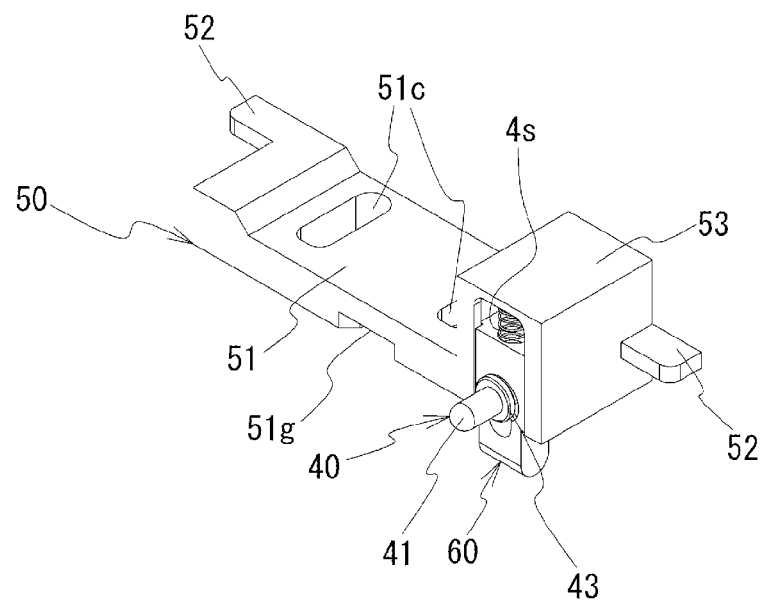
FIGS. 4A and 4B are explanatory views of each member.
Figure 4B:
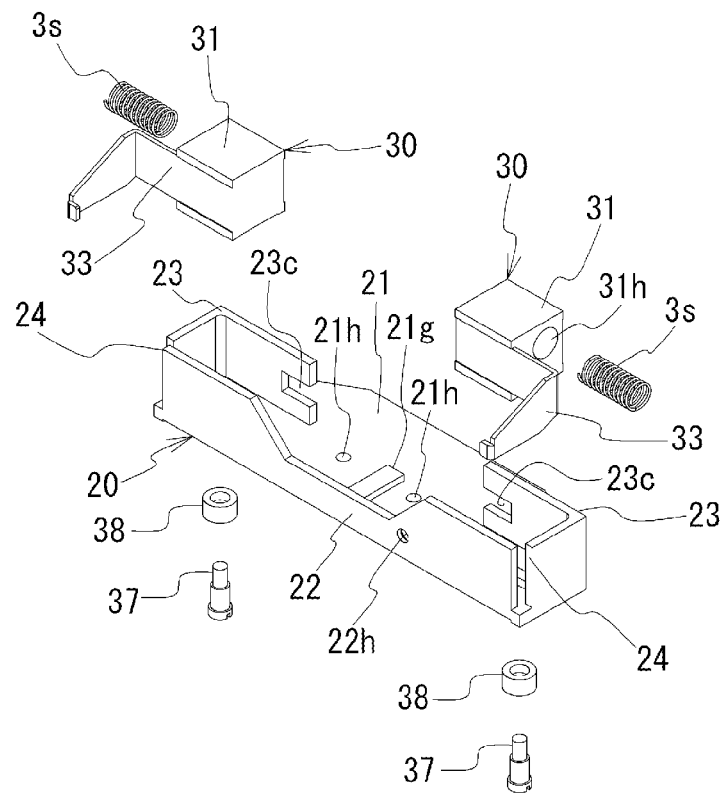

A description will be given of the housing 20, the hands 30, the operation body 40, and the lock member 50. FIGS. 3A to 5C are explanatory views of each member. As illustrated in FIGS. 3A, 3B, and 4B, the housing 20 includes: a bottom portion 21 having a flat board shape; a front wall 22 standing on the bottom portion 21; surrounding walls 23 respectively standing at the both sides of the bottom portion 21 and each having a substantially L shape. As illustrated in FIG. 3A, the hand 30 is held within the space surrounded by the front wall 22 and the surrounding wall 23. The hand 30 includes: a holding body 31 having a substantially rectangular; and a nail 33 held by the holding body 31. The nail 33 is provided for grasping the storage medium 1. The nail 33 has a substantially L shape. Additionally, the surrounding wall 23 is provided with a cutout 23c for escaping a projection piece 52 as will be described later.

As illustrated in FIG. 4B, the hand 30 is formed with a hole 31h into which a spring 3s is inserted. The spring 3s is arranged between the holding body 31 and the surrounding wall 23 in such a state as to be compressed. Therefore, a pair of the hands 30 are biased to be closer to each other.

Also, as illustrated in FIG. 3A, a cutout 24 is provided, between the front wall 22 and the surrounding wall 23, for projecting the nail 33 out of the housing 20.

As illustrated in FIG. 3A, the lock member 50 is arranged between the pair of the hands 30. As illustrated in FIGS. 3B, 4A, and 5A to 5C, the lock member 50 includes: a body portion 51; the projection pieces 52 respectively provided at the both sides of the body portion 51; a block portion 53 provided at one end of the body portion 51. As illustrated in FIG. 3B, the body portion 51 is provided at its bottom surface with a groove portion 51g. Also, the housing 20 is provided at its bottom portion 21 with a rail portion 21g. The rail portion 21g and the groove portion 51g are engaged with each other, thereby guiding the lock member 50 forwardly and rearwardly relative to the housing 20.

As illustrated in FIG. 3B, the housing 20 and the lock member 50 are coupled to each other by a screw 71, a plate 73, and spacers 75. The housing 20 is formed at its bottom portion 21 with threaded holes 21h. The screws 71 penetrate through holes formed in the plate 73 and threadedly engage the threaded holes 21h of the housing 20, respectively. Also, the screws 71 threadedly engage the threaded holes 21h in such a state as to be loosely inserted into the spacers 75, respectively. The spacer 75 has a cylindrical shape. The body portion 51 is formed with oblong holes 51c. The screws 71 and the spacers 75 are inserted into the oblong holes 51c, respectively. Also, the plate 73 is attached on the upper surface of the body portion 51. The screws 71 threadedly engage the threaded holes 21h respectively, whereby the lock member 50 is coupled to the housing 20 as illustrated in FIG. 3A.

Figure 5A:
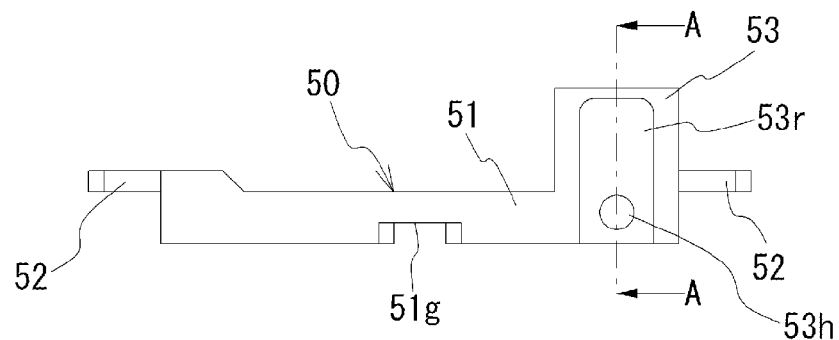
FIGS. 5A to 5C are explanatory views of each member.
Figure 5B:
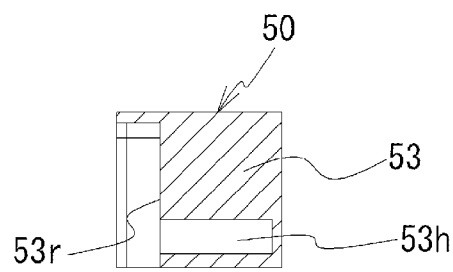
Figure 5C:
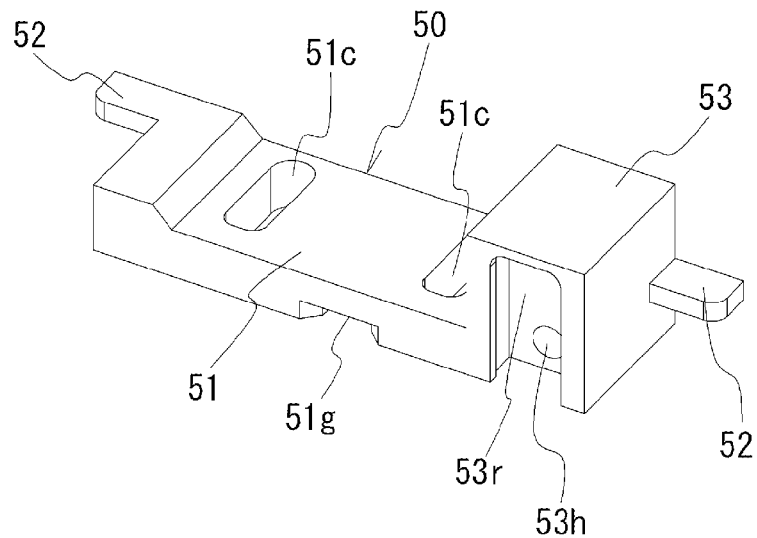

Next, the operation body 40 will be described. As illustrated in FIGS. 3A and 3B, the operation body 40 penetrates through a hole 22h formed in the front wall 22 of the housing 20 so that the operation body 40 may be pushed. Also, as illustrated in FIGS. 3B and 4A, a transmission member 60 is arranged between the operation body 40 and the lock member 50. The operation body 40 includes: a body portion 41 having a pin shape; and a flange portion 43 formed in the body portion 41, as illustrated in FIG. 4A. The front wall 22 faces the storage medium 1 as the object to be grasped. The front wall 22 holds the operation body 40. The transmission member 60 is provided with a hole through which the operation body 40 penetrates. This hole will be described later in detail. The lock member 50 is provided at its block portion 53 with a receiving portion 53r for receiving the transmission member 60. The transmission member 60 is biased downwardly relative to the lock member 50 by a spring 6s. The operation body 40 is biased forwardly relative to the lock member 50 by a spring 4s. The spring 4s is housed in a hole 53h as illustrated in FIGS. 5A and 5B. Pushing of the operation body 40 moves the lock member 50. This will be described later in detail.

As illustrated in FIG. 4B, a pin 37 is fixed to a bottom surface of the holding body 31 in such a state as to penetrate through a roller 38. The roller 38 is capable of rotating about the pin 37. Also, the housing 20 is provided at its bottom portion 21 with a hole, not illustrated, for escaping the pin 37. The roller 38 is held by the pin 37 at the outside of the housing 20. The roller 38 moves within the groove 18 in response to the movement of the housing 20.

Figure 6A:
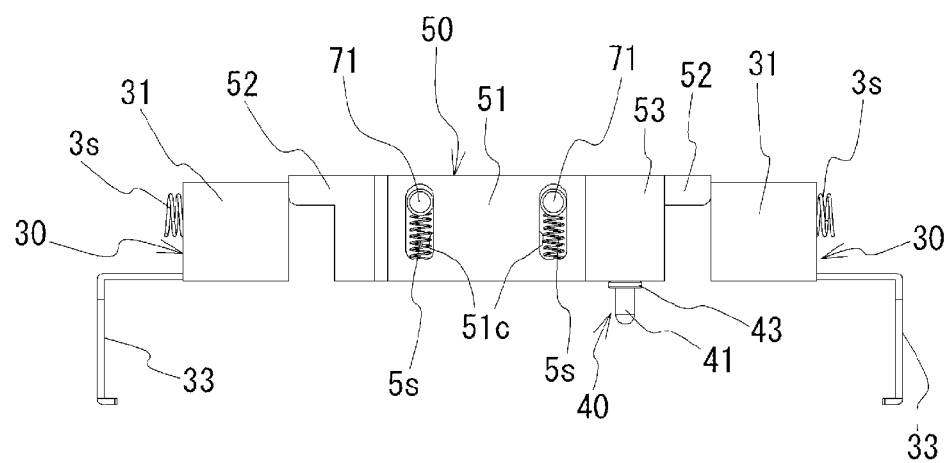
FIGS. 6A and 6B are explanatory views of the movements of other members before an operation body is pushed.
Figure 6B:
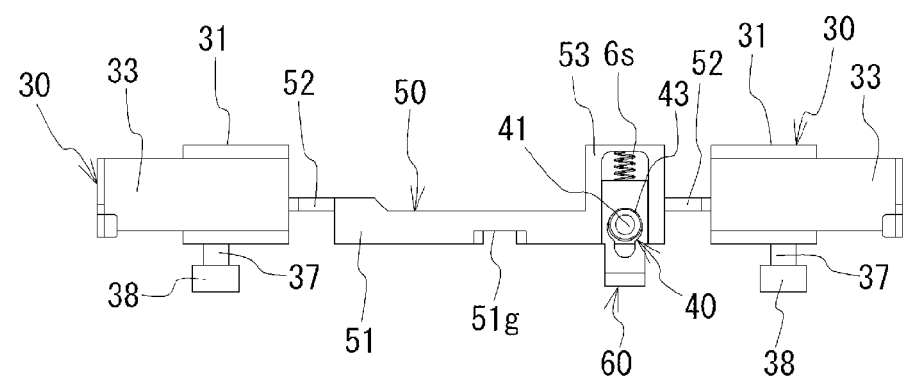
Figure 7A:
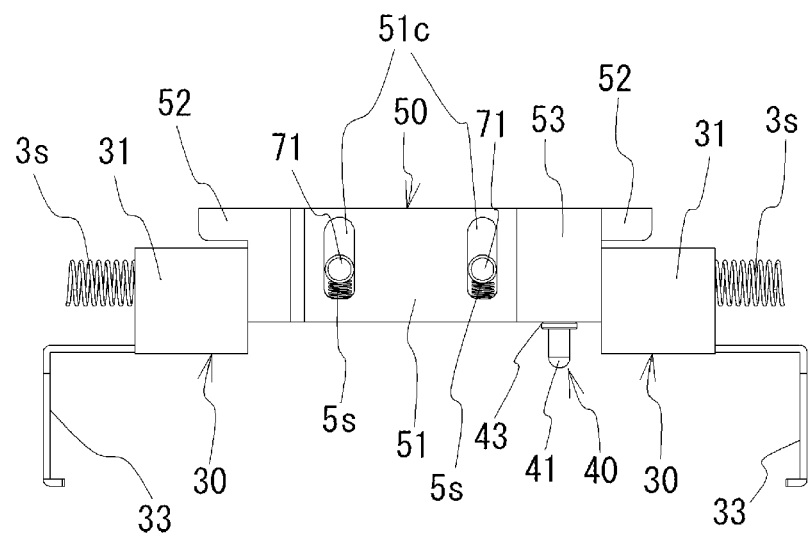
FIGS. 7A and 7B are explanatory views of the movements of other members by pushing the the operation body.
Figure 7B:
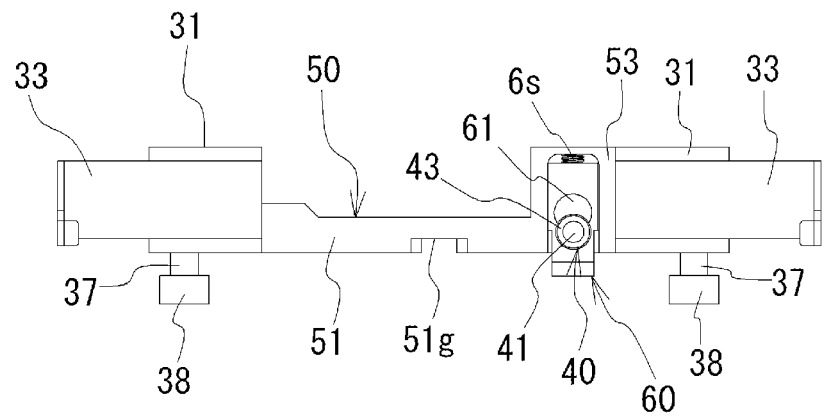

Next, movements of other members by pushing of the operation body 40 will be described. FIGS. 6A to 7B are explanatory views of the movements of the other members by pushing of the operation body 40. FIGS. 6A and 6B illustrate the hands 30, the operation body 40, and the lock member 50 in the non-grasping state. FIGS. 7A and 7B illustrate the hands 30, the operation body 40, and the lock member 50 in the grasping state. FIGS. 6A and 7A are top views. FIGS. 6B and 7B are front views.

The projection pieces 52 respectively abuts the holding bodies 31 in the non-grasping state as illustrated in FIGS. 6A and 6B. As mentioned above, the holding body 31 is biased inwardly by the spring 3s. The lock member 50 restricts the hands 30 to the non-grasping state against the biasing force of the springs 3s. A position of the lock member 50 in the non-grasping state is referred to as restricted position.

Additionally, springs 5s are respectively arranged within the oblong holes 51c. The screws 71 are secured to the housing 20. Thus, the springs 5s bias the lock member 50 forwardly.

As will be described later in detail, the operation body 40 is pushed when the transmission member 60 is moved upwardly from the state illustrated in FIGS. 6A and 6B, thereby moving the transmission member 60 rearwardly in response to the rearward movement of the operation body 40. Also, this moves the lock member 50 reawardly. When the lock member 50 moves reawardly, the projection pieces 52 move away from the holding body 31. Therefore, the hands 30 respectively are abutted with the side surfaces of the body portion 51 by the biasing forces of the springs 3s, as illustrated in FIGS. 7A and 7B. Thus, the pair of the hands 30 moves close to each other. In this state, the hands 30 grasps the storage medium 1. In such a manner, the lock member 50 releases the restriction of the non-grasping state to allow the hands 30 to be in the grasping state. A position of the lock member 50 in this state is referred to as released position. The lock member 50 is an example of a restriction portion movable between the restricted position and the released position. Heretofore, the operation body 40 pushes the lock member 50 from the restricted position to the released position in response to pushing of the operation body 40 by the storage medium 1. Also, the springs 3s are an example of a close mechanism. Moreover, the springs 3s are an example of biasing portions for biasing the hands 30 to be in the grasping state.

Figure 8A:
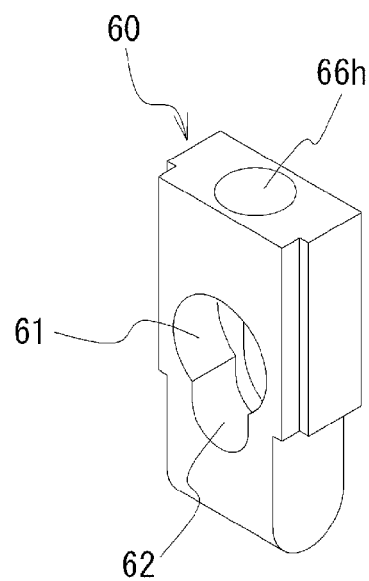
FIGS. 8A to 8D are explanatory views of a transmission member.
Figure 8B:
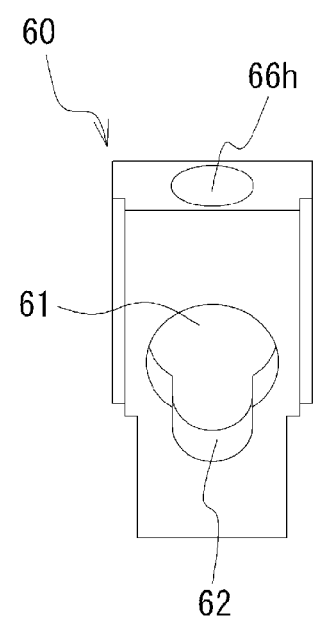

Next, the transmission member 60 will be described. FIGS. 8A to 8D are explanatory views of the transmission member 60. The transmission member 60 is provided at its upper end with a hole 66h into which the spring 6s is inserted. Also, the transmission member 60 is formed with an enlarged portion 61, a reduced portion 62, and an oblong hole portion 63. These portions are continuous with one another to define a single through-hole. The enlarged portion 61 and the reduced portion 62 are formed at the front side of the transmission member 60. The oblong hole portion 63 is formed at the rear side of the transmission member 60. As illustrated in FIGS. 8A and 8B, the enlarged portion 61 is positioned above the reduced portion 62. The enlarged portion 61 has a size to permit the flange portion 43 of the operation body 40 to pass therethrough. The reduced portion 62 has a size to restrict the flange portion 43 of the operation body 40 from pass therethrough. That is, the enlarged portion 61 is larger than the flange portion 43, and the reduced portion 62 is smaller than the flange portion 43. The enlarged portion 61 and the reduced portion 62 have such a shape that two circular holes are connected to each other.

Figure 8C:
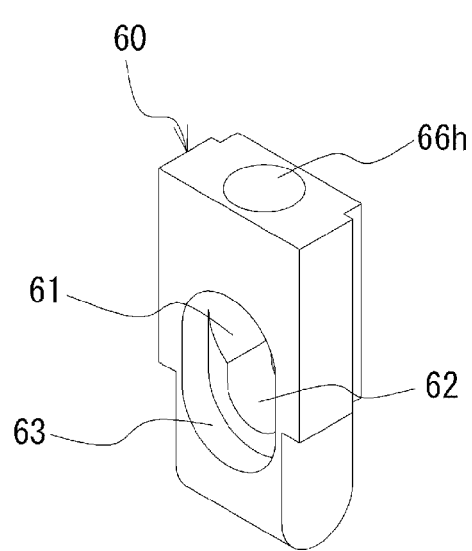
Figure 8D:
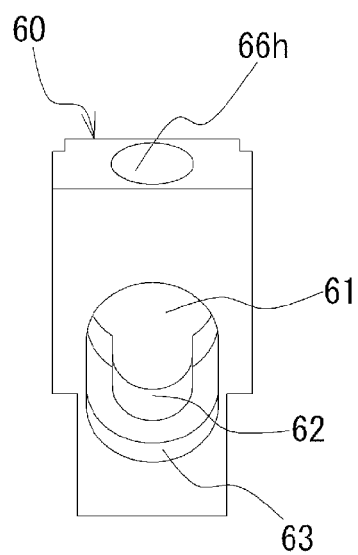

As illustrated in FIGS. 8C and 8D, the oblong hole portion 63 has an oblong-hole shape extending in a lengthwise direction. The oblong hole portion 63 is larger than the flange portion 43. Thus, when the transmission member 60 is positioned at the lower side of the operation body 40, the flange portion 43 may pass through the enlarged portion 61 and the oblong hole portion 63. On the other hand, when the transmission member 60 is positioned at the upper side of the operation body 40, the flange portion 43 may not pass through the reduced portion 62.

Thus, even when the transmission member 60 is positioned at the lower side of the operation body 40 and the operation body 40 is pushed, the transmission member 60 does not move in response to the operation body 40. When the transmission member 60 is positioned at the upper side of the operation body 40, the transmission member 60 moves in response to pushing of the operation body 40. Thus, the transmission member 60 is formed with a through hole which permits the flange portion 43 to pass therethrough or restrict the flange portion 43 from passing therethrough, in response to a positional relationship with the operation body 40.

Also, in response to the positional relationship with the operation body 40, the transmission member 60 has a function for transmitting the movement of the operation body 40 by pushing the operation body 40 to the lock member 50, or for escaping the movement of the operation body 40 without transmitting the movement of the operation body 40. This is because the transmission member 60 is pushed rearwardly in response to pushing of the operation body 40 and then the lock member 50 is moved rearwardly.

Figure 9A:
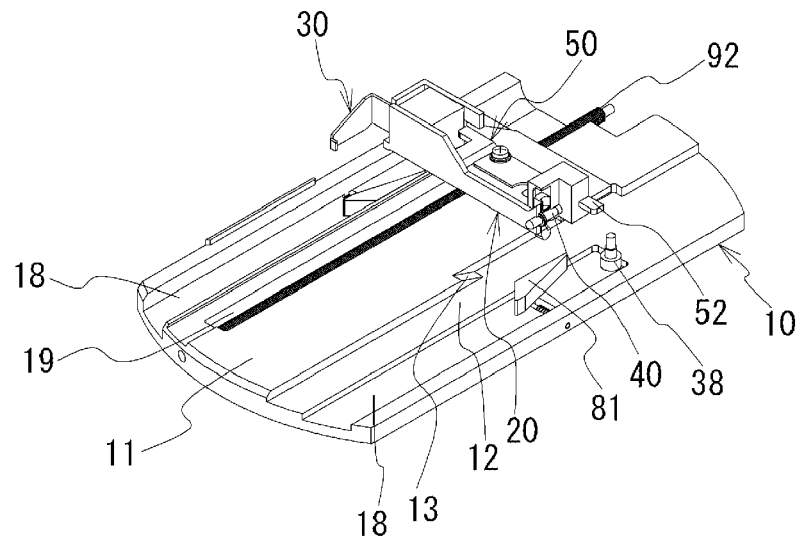
FIGS. 9A to 9C are explanatory views of the movement of the robot hand.
Figure 9B:
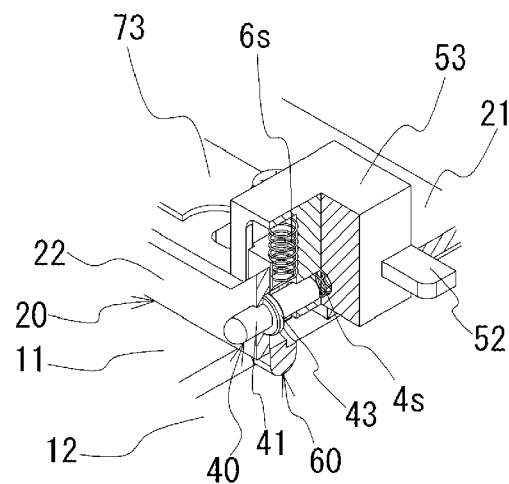
Figure 9C:
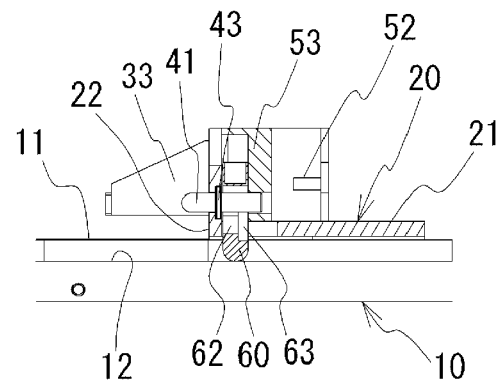

Next, the movement of the robot hand 5 will be described. FIGS. 9A to 25C are explanatory views of the movement of the robot hand 5. FIGS. 9A to 9C are explanatory views of the robot hand 5 in the waiting state. Additionally, parts of the housing 20 and the hands 30 are partially omitted in FIG. 9A. FIG. 9B is an enlarged view around the operation body 40. FIG. 9C is a side view around the operation body 40. As illustrated in FIGS. 9B and 9C, the operation body 40 is biased toward the front wall 22 of the housing 20 by the spring 4s. The flange portion 43 abuts the front wall 22. Also, the transmission member 60 is biased toward the sliding surface 12 by the spring 6s. The flange portion 43 is positioned at the front side of the transmission member 60. When the operation body 40 is pushed in this state, the flange portion 43 passes through the enlarged portion 61 and the oblong hole portion 63, whereby the transmission member 60 is not moved in response to pushing of the operation body 40.

Figure 10A:
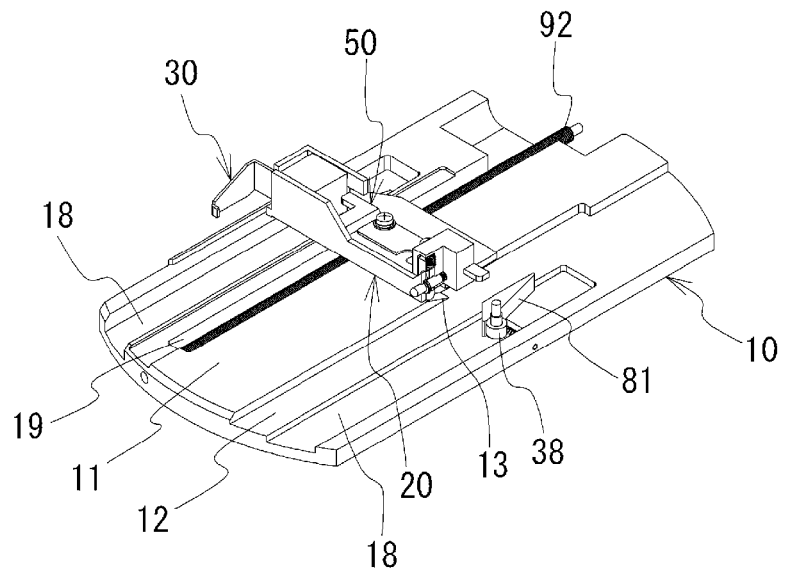
FIGS. 10A to 10C are explanatory views of the movement of the robot hand.
Figure 10B:
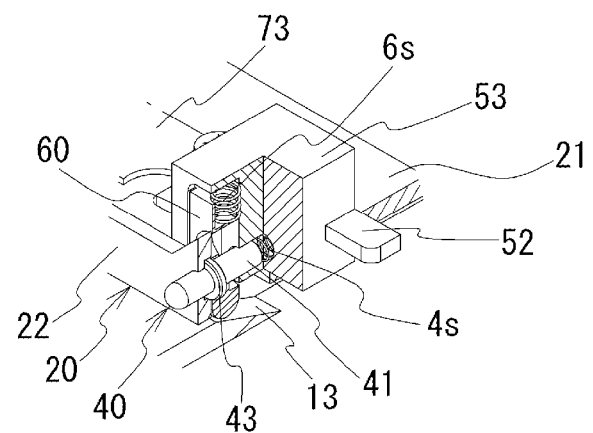
Figure 10C:
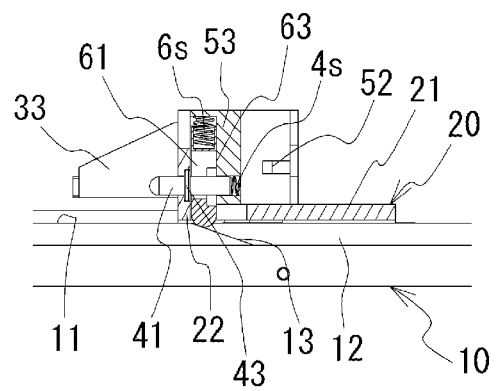
Figure 11A:
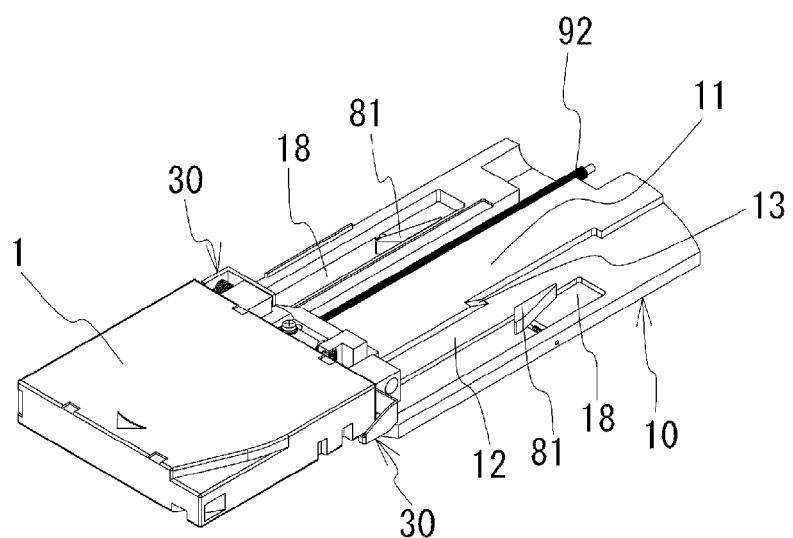
FIGS. 11A and 11B are explanatory views of the movement of the robot hand.
Figure 11B:
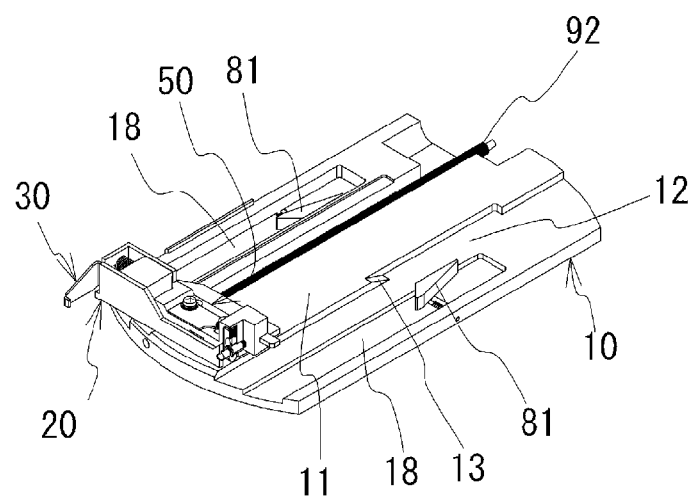
Figure 12A:
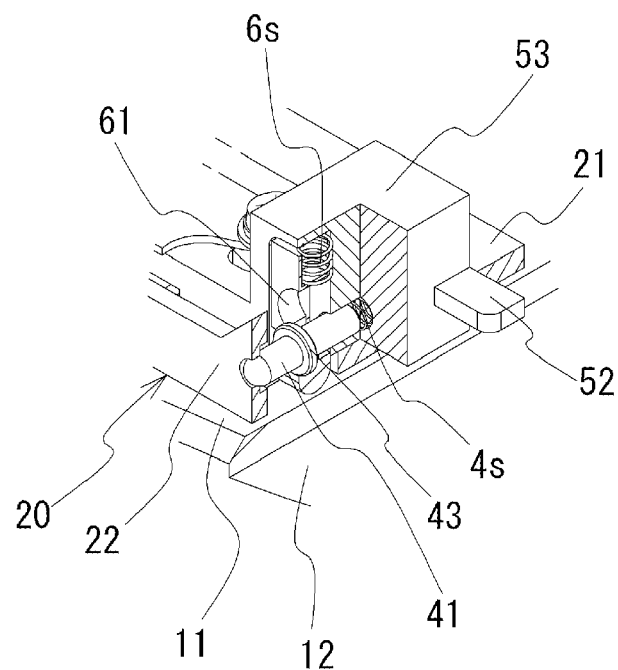
FIGS. 12A and 12B are explanatory views of the movement of the robot hand.
Figure 12B:
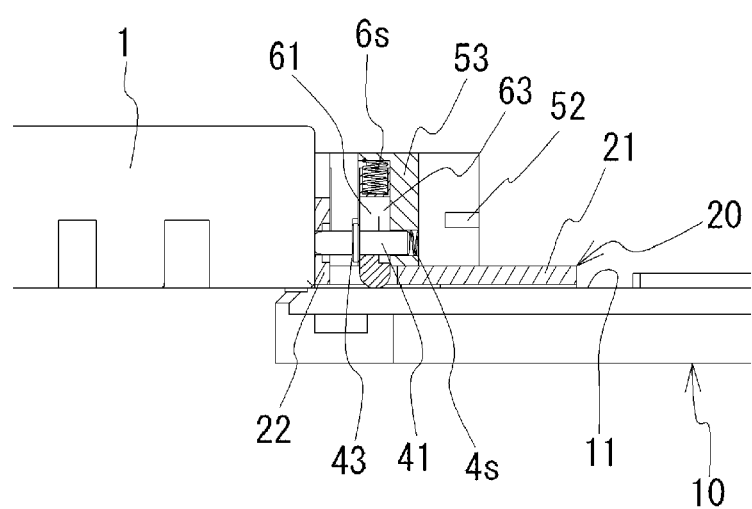

When the housing 20 advances, the transmission member 60 slides over the inclined surface 13 to move up as illustrated in FIGS. 10A to 10C. After finishing sliding over the inclined surface 13, the transmission member 60 slides over the sliding surface 11. Therefore, the transmission member 60 moves upward relative to the operation body 40. Thus, the sliding surfaces 11 and 12, and the inclined surface 13 are an example of a sliding surface over which the transmission member 60 slides and which includes a difference in height so as to change the positional relationship between the transmission member 60 and the operation body 40. When the operation body 40 is supposedly pushed in the state illustrated in FIGS. 10A to 10C, the flange portion 43 may not pass through the reduced portion 62, whereby the transmission member 60 is moved reawardly in response to pushing of the operation body 40. Additionally, the roller 38 moves without abutting the release body 81 as illustrated in FIG. 10A, When the housing 20 further moves to arrive at a front end position, the operation body 40 is pushed by the storage medium 1 as illustrated in FIG. 11A, whereby the pair of the hands 30 grasp the storage medium 1. This is because the operation body 40 is pushed to move the lock member 50 together with the transmission member 60 reawardly relative to the housing 20 as illustrated in FIGS. 12A and 12B. As illustrated in FIGS. 7A and 7B, the projection pieces 52 respectively move away from the holding bodies 31, and then the nails 33 grasp the storage medium 1 with the biasing forces of the spring 3s.

Figure 13A:
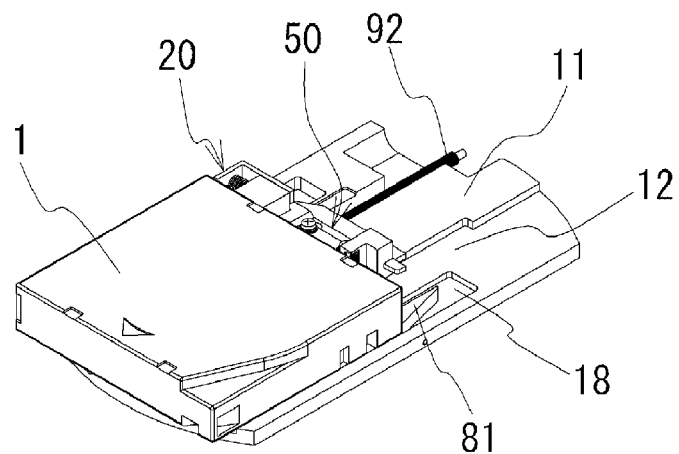
FIGS. 13A and 13B are explanatory views of the movement of the robot hand.
Figure 13B:
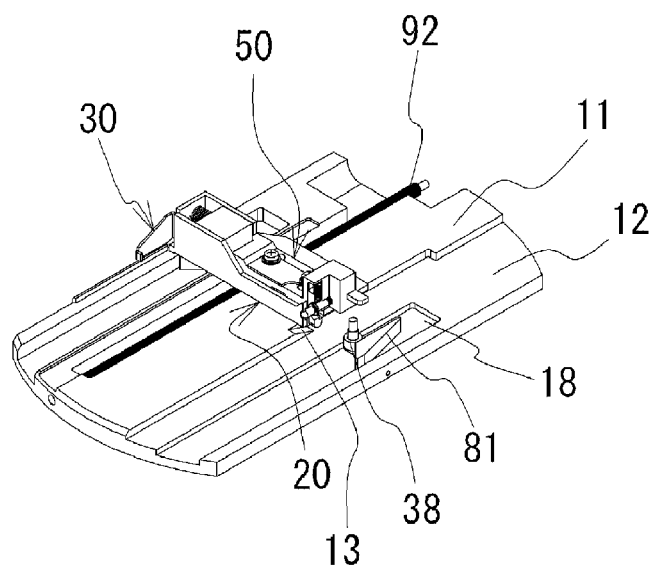

Next, the housing 20 retreats in the grasping state, and then the storage medium 1 is pulled onto the baseboard 10 as illustrated in FIGS. 13A and 13B. Also, the roller 38 moves to push away the release body 81 against the biasing force of the spring 8s. That is, the position of the roller 38 is not influenced by the release body 81.

Figure 14A:
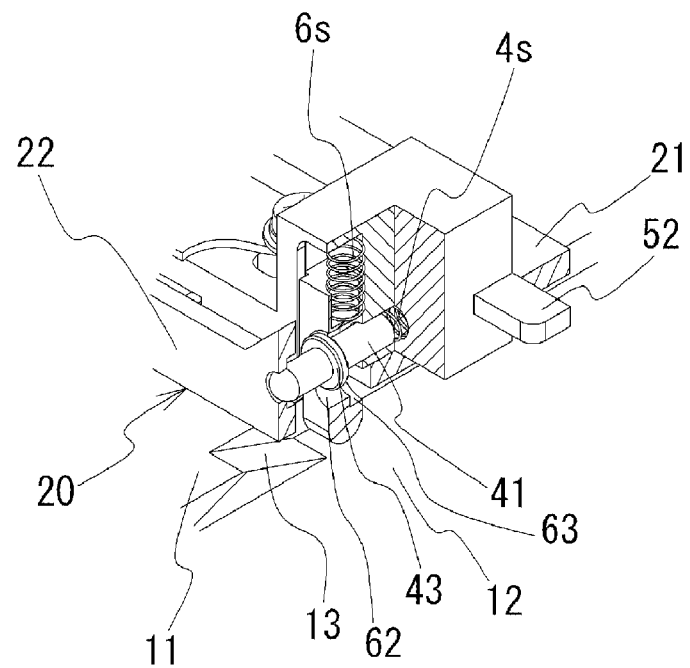
FIGS. 14A and 14B are explanatory views of the movement of the robot hand.
Figure 14B:
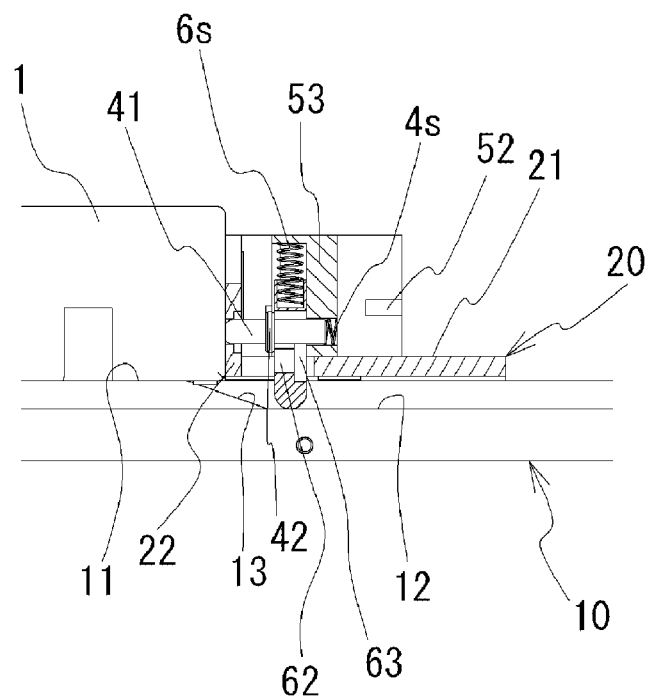

As illustrated in FIGS. 14A and 14B, while the housing 20 is being returned to the rear position, the transmission member 60 slides down over the inclined surface 13 and then slides from the sliding surface 11 to the sliding surface 12. As illustrated in FIGS. 14A and 14B, the transmission member 60 moves downwardly relative to the operation body 40. In this case, the lock member 50 is biased forwardly by the springs 5s as illustrated in FIG. 7A. However the projection pieces 52 respectively abut the rear end surfaces of the holding bodies 31, thereby maintaining the grasping state.

Figure 15A:
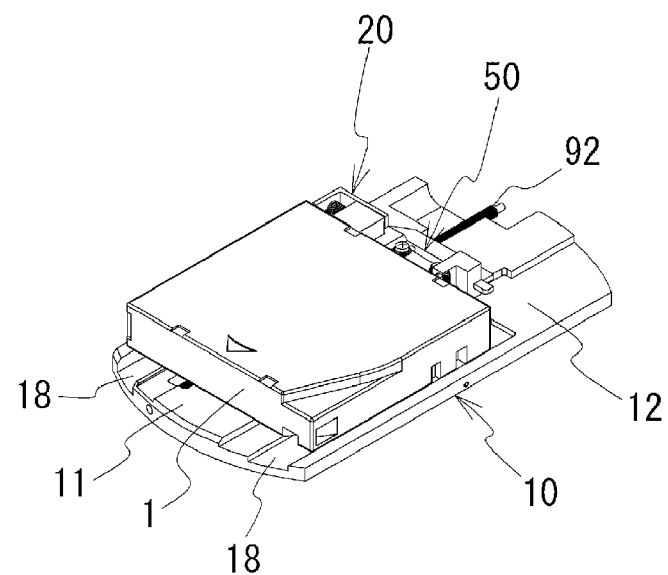
FIGS. 15A and 15B are explanatory views of the movement of the robot hand.
Figure 15B:
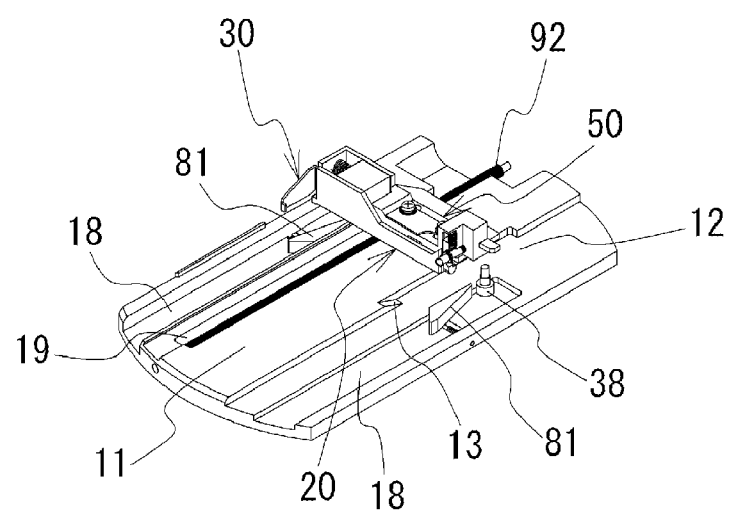
Figure 16A:
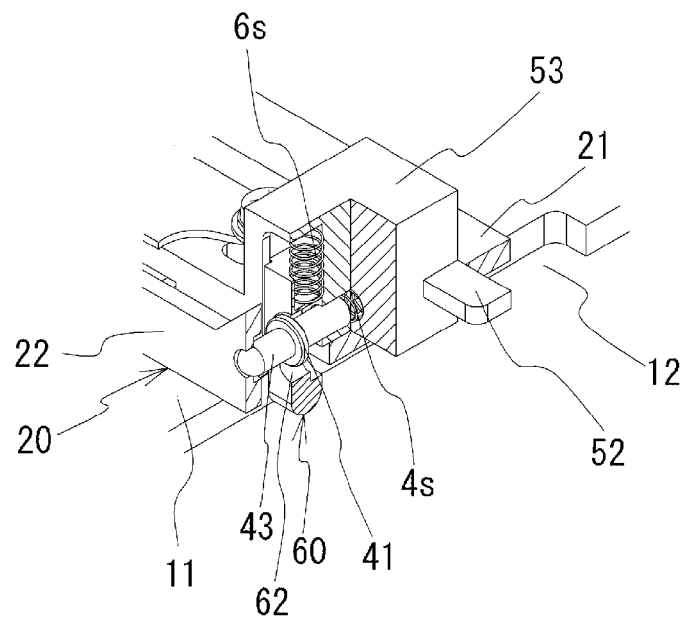
FIGS. 16A and 16B are explanatory views of the movement of the robot hand.
Figure 16B:
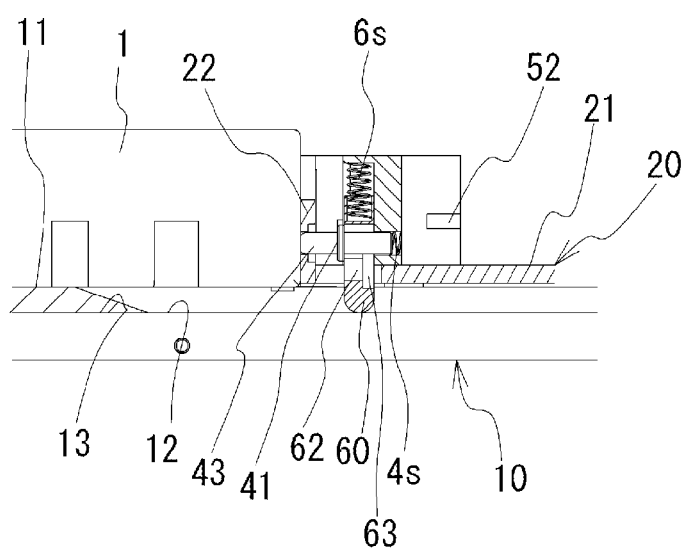

Subsequently, the housing 20 in the grasping state stops at the rear end position as illustrated in FIGS. 15A and 15B. As illustrated in FIGS. 16A and 16B, the operation body 40 is maintained to be pushed.

Figure 17A:
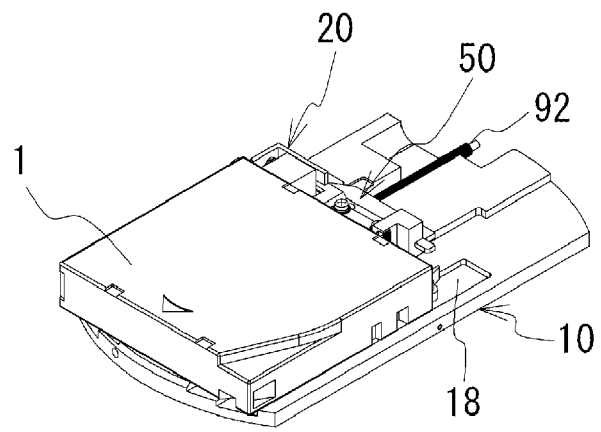
FIGS. 17A and 17B are explanatory views of the movement of the robot hand.
Figure 17B:
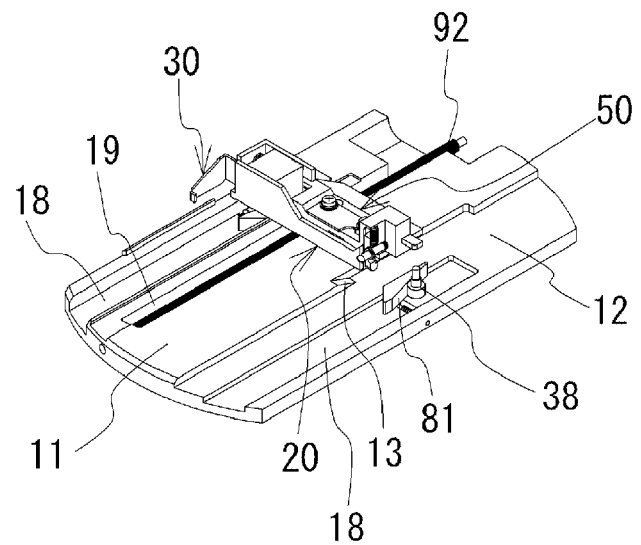
Figure 18A:
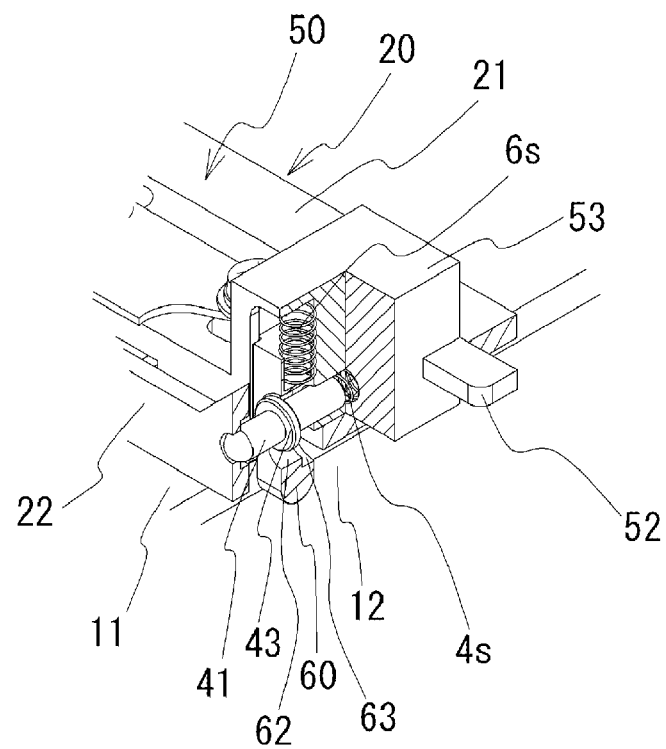
FIGS. 18A and 18B are explanatory views of the movement of the robot hand.
Figure 18B:
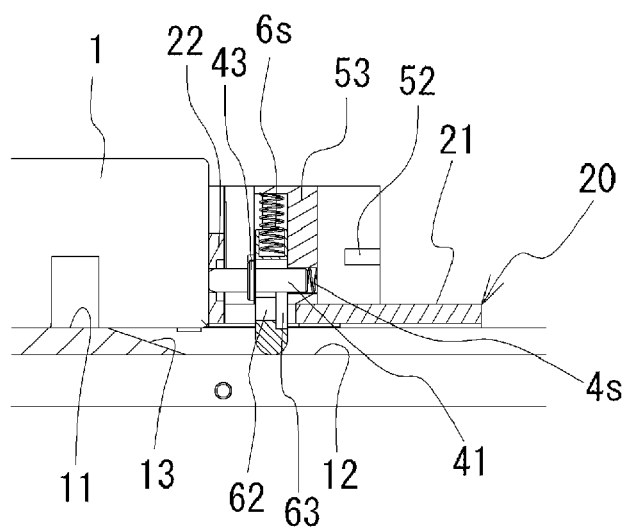

Next, the movement of the robot hand 5 pushing out the storage medium 1 will be described. When the housing 20 advances in the grasping state, the roller 38 begins abutting the release body 81 as illustrated in FIG. 17B. Further, when the roller 38 begins abutting the release body 81, the transmission member 60 slides over the sliding surface 12 as illustrated in FIGS. 18A and 18B.

Figure 19A:
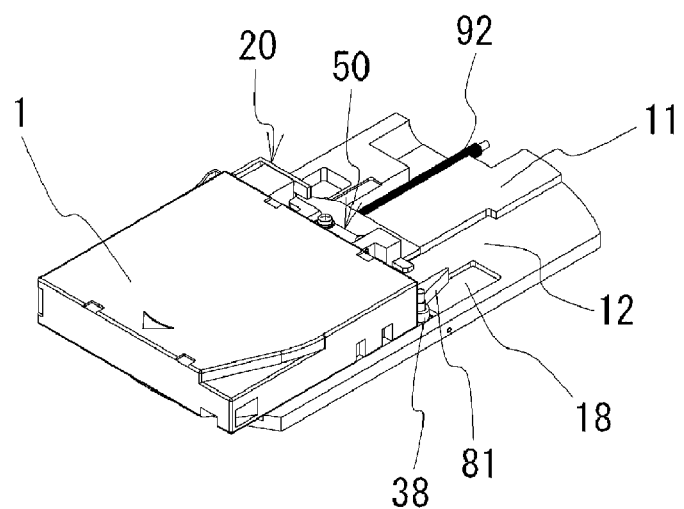
FIGS. 19A and 19B are explanatory views of the movement of the robot hand.
Figure 19B:
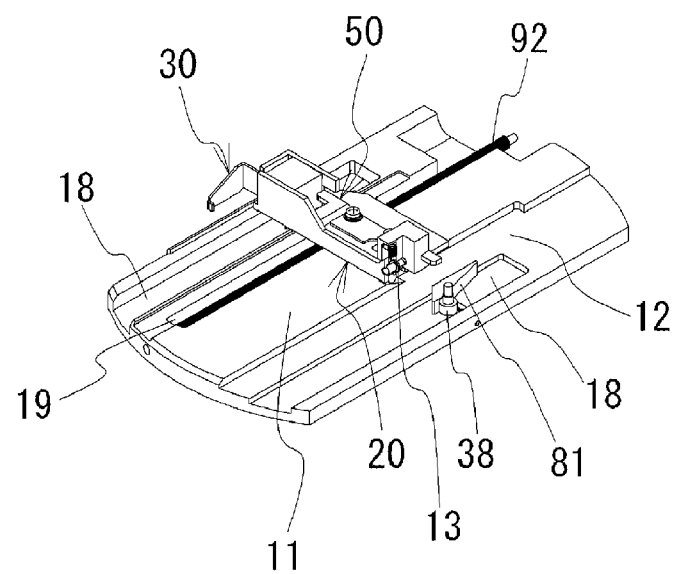

When the housing 20 further advances, the roller 38 is moved toward the outside by abutting the release body 81 as illustrated in FIGS. 19A and 19B. The pair of the rollers 38 moves away from each other, and then the pair of the hands 30 moves away from each other against the biasing forces of the springs 3s. Therefore, the pair of the hands 30 shifts into the non-grasping state in which the storage medium 1 is released. When the hands 30 moves away from each other, the lock member 50 moves forwardly relative to the housing 20 and then returns to the original position. Therefore, the lock member 50 maintains the non-grasping state of the hands 30. That is, the lock member 50 moves to the restricted position. The transmission member 60 moves forwardly in response to the movement of the lock member 50 toward the restricted position. Therefore, the enlarged portion 61 of the transmission member 60 moves forwardly relative to the flange portion 43 of the operation body 40.

Figure 20A:
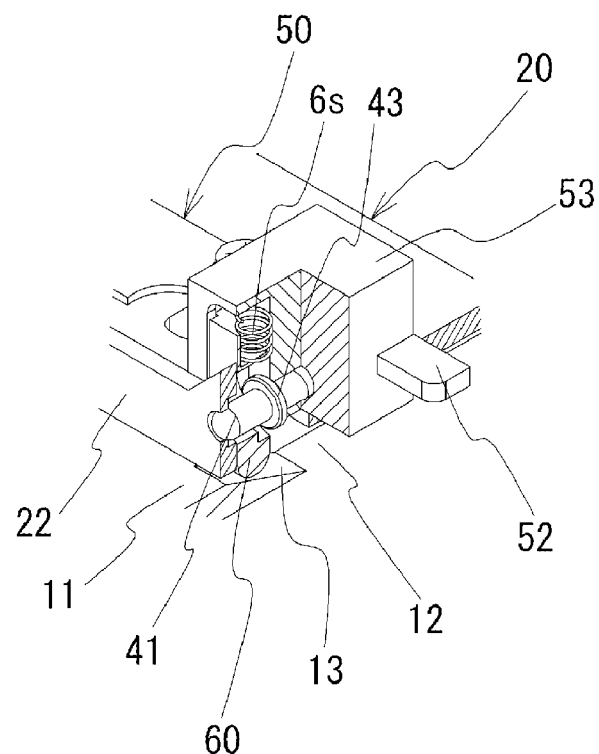
FIGS. 20A and 20B are explanatory views of the movement of the robot hand.
Figure 20B:
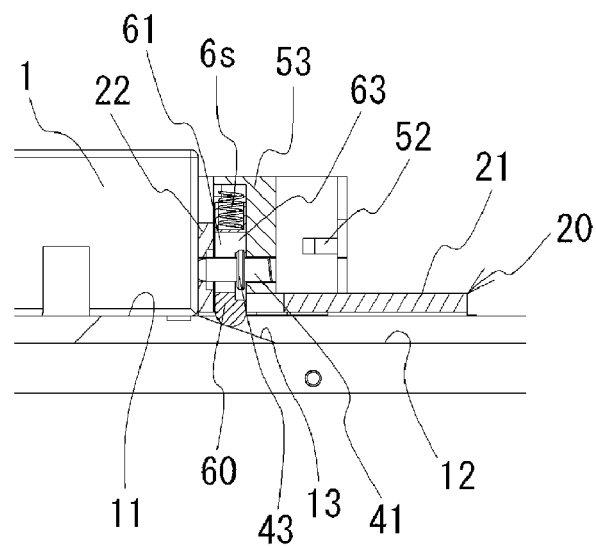
Figure 21A:
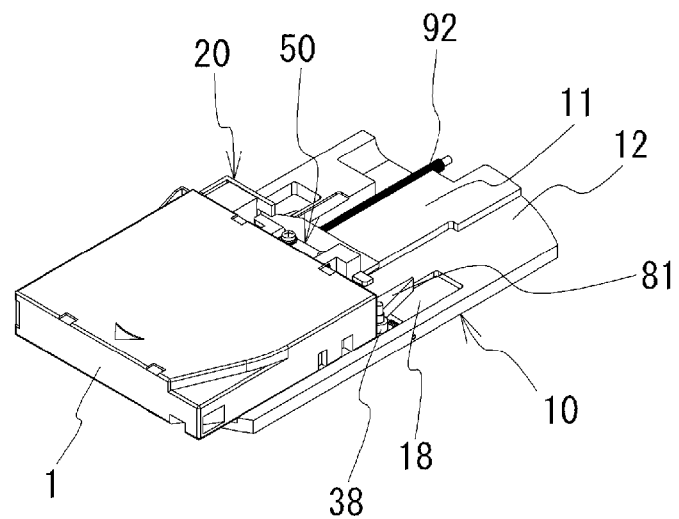
FIGS. 21A and 21B are explanatory views of the movement of the robot hand.
Figure 21B:
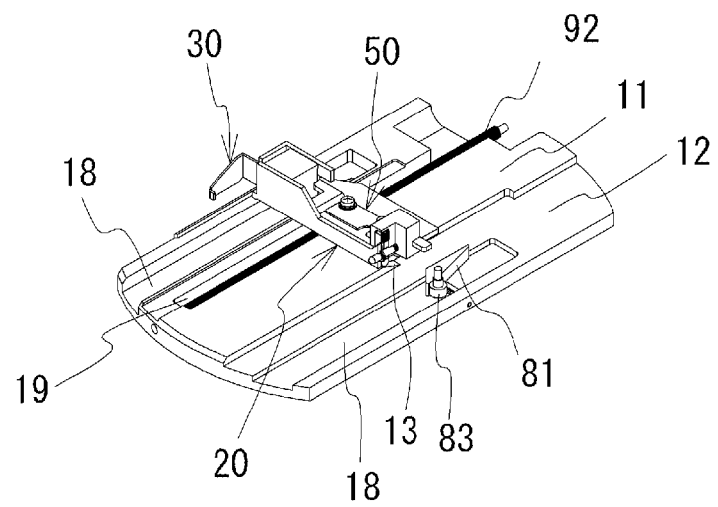
Figure 22A:
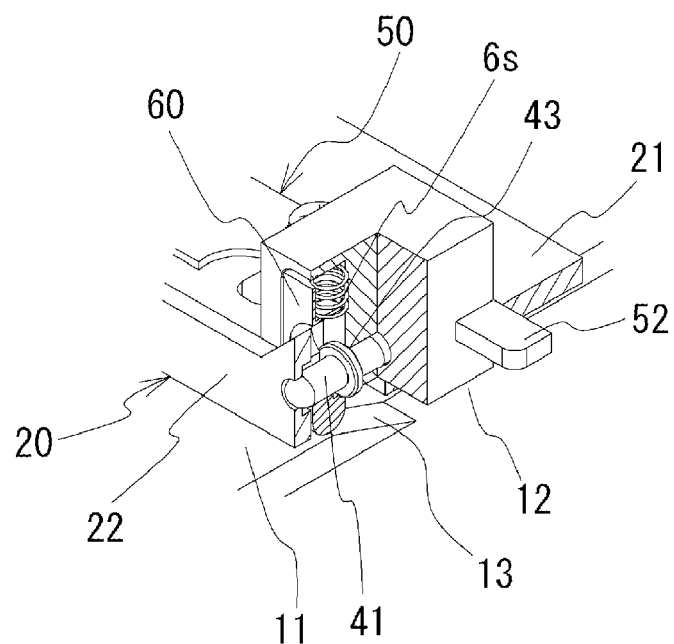
FIGS. 22A and 22B are explanatory views of the movement of the robot hand.
Figure 22B:
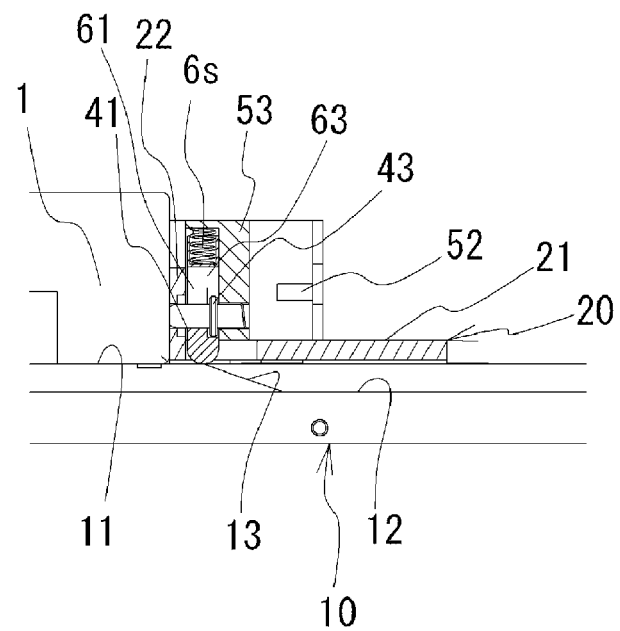

After the lock member 50 moves toward the restricted position in such a way, the transmission member 60 begins moving upward over the inclined surface 13 as illustrated in FIGS. 20A and 20B. Therefore, the transmission member 60 moves up relative to the operation body 40. When the transmission member 60 arrives at the sliding surface 11, the body portion 41 penetrates through the reduced portion 62 and the flange portion 43 is positioned at the rear side of the reduced portion 62 as illustrated in FIGS. 21A to 22B. This restricts the flange portion 43 from passing through the reduced portion 62. Therefore, the operation body 40 is maintained to be pushed.

Figure 23A:
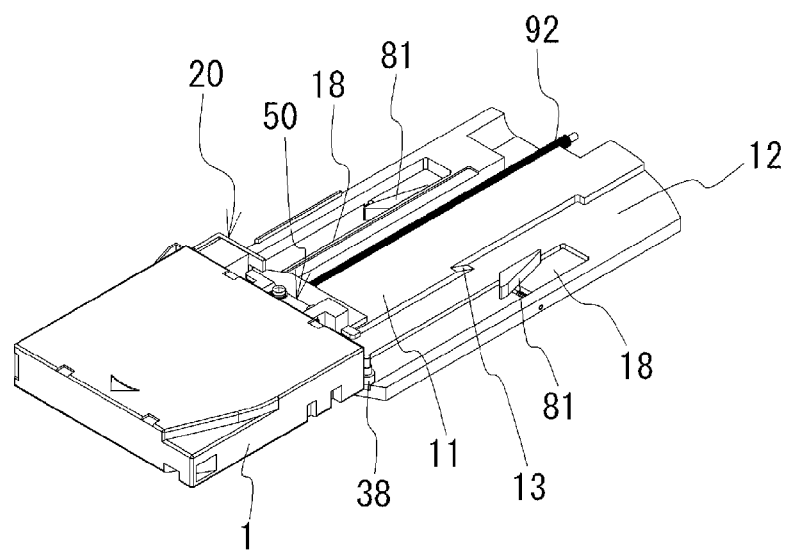
FIGS. 23A and 23B are explanatory views of the movement of the robot hand.
Figure 23B:
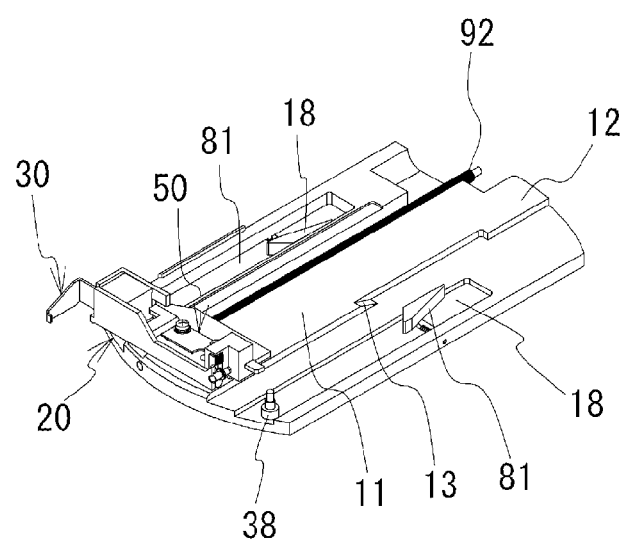
Figure 24A:
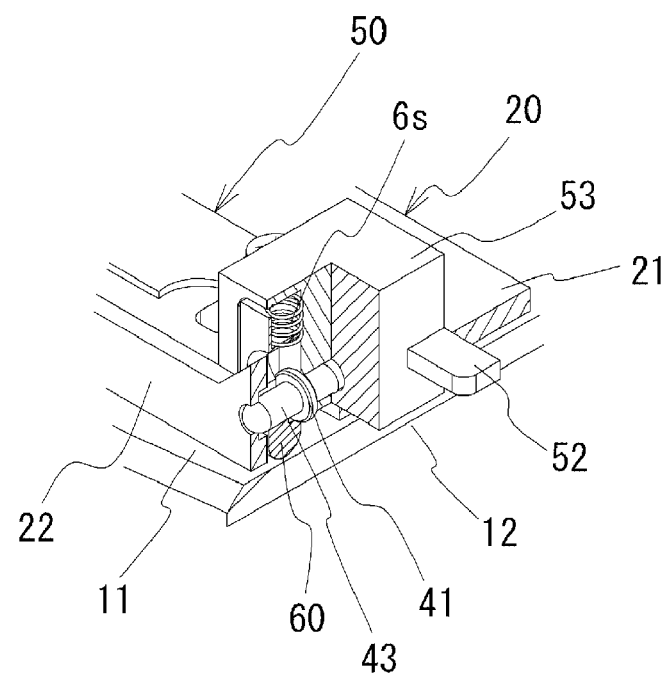
FIGS. 24A and 24B are explanatory views of the movement of the robot hand.
Figure 24B:
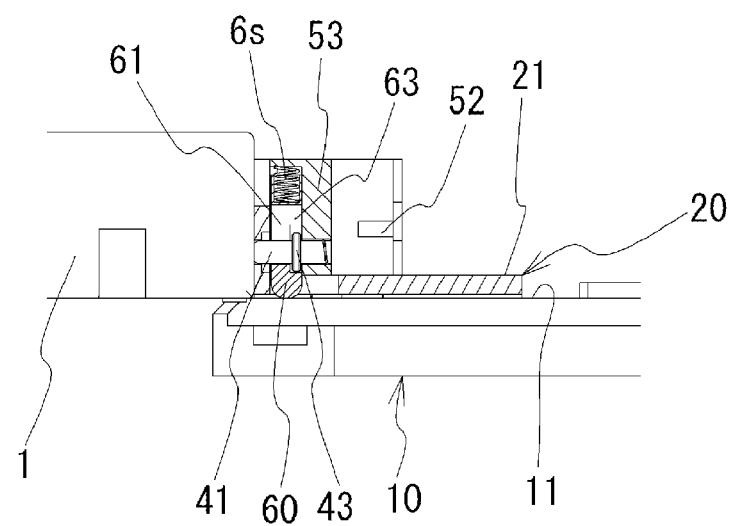

The housing 20 advances in this state to push the storage medium 1 out of the baseboard 10 as illustrated in FIGS. 23A and 23B. The storage medium 1 is returned to a given position of the rack 2. In this state, the operation body 40 is kept in a pushed state as illustrated in FIGS. 24A and 24B.

Figure 25A:
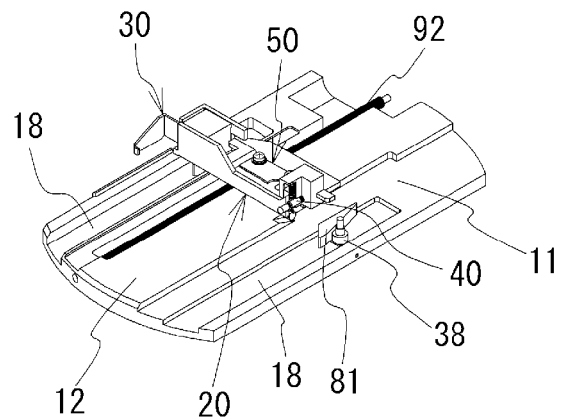
FIGS. 25A to 25C are explanatory views of the movement of the robot hand.
Figure 25B:
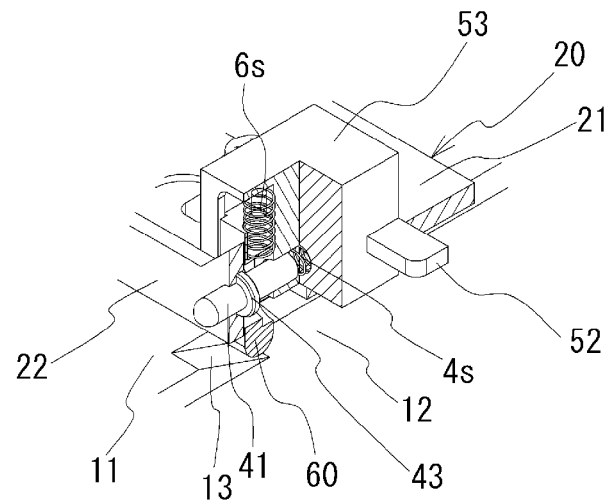
Figure 25C:
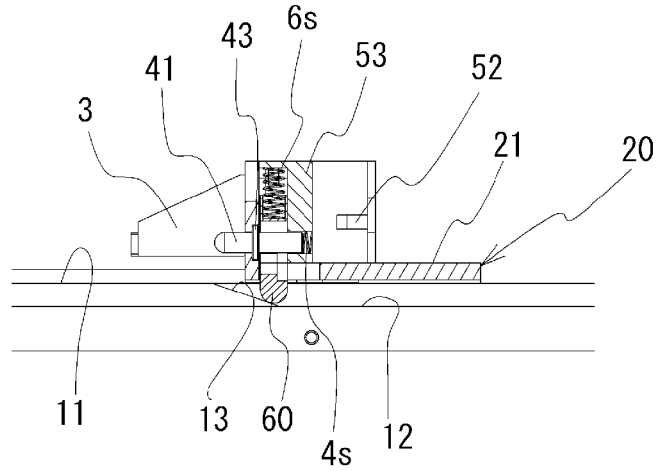

When the housing 20 retreats in this state and then the transmission member 60 moves down over the inclined surface 13, the transmission member 60 moves down relative to the operation body 40 as illustrated in FIGS. 25A to 25C. The flange portion 43 moves from the reduced portion 62 toward the enlarged portion 61. Since the enlarged portion 61 is larger than the flange portion 43 and the operation body 40 is biased forwardly by the biasing force of the spring 4s, the flange portion 43 passes through the enlarged portion 61, and then one end of the body portion 41 projects from the front wall 22. The housing 20 further retreats in this state. The operation body 40 returns to an initial state in such a way. Additionally, the roller 38 does not abut the release body 81 as illustrated in FIG. 25A at this time.

As mentioned above, the operation body 40 is pushed by the storage medium 1, whereby the hands 30 grasp the storage medium 1. This may prevent the hands from becoming the grasping state although there is no storage medium 1. Therefore, the malfunction of the robot hand 5 may be prevented.

Also, the housing 20 holds the hands 30 for grasping the storage medium 1 and is capable of pushing the storage medium 1. In such a way, parts are aggregated. This may achieve downsizing, light weight, and simplification of the robot hand 5.

Figure 26A:
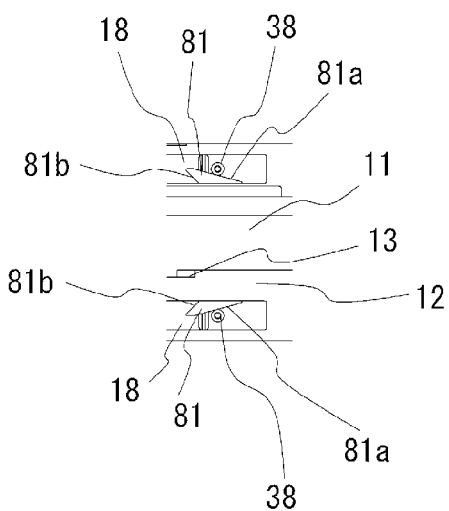
FIGS. 26A to 26D are explanatory views of opening bodies.
Figure 26B:
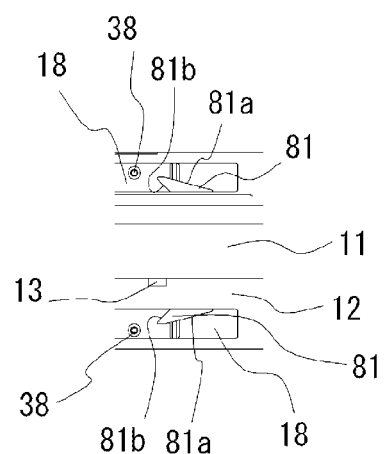

Next, the release bodies 81 will be described. FIGS. 26A to 26D are explanatory views of the release bodies 81. Additionally, the springs 8s for respectively biasing the release bodies 81 inwardly are omitted in FIGS. 26A to 26D. FIGS. 26A and 26B illustrate the trajectories of the rollers 38 when the housing 20 moves from the rear end position toward the front end position in the grasping state. The release body 81 includes a guide surface 81a for guiding the roller 38 outwardly. The roller 38 abuts the guide surface 81a as illustrated in FIG. 26A, and then roller 38 is guided outwardly as illustrated in FIG. 26B. Therefore, the grasping state is shifted into the non-grasping state. In such a way, while the housing 20 is advancing in the grasping state, the release body 81 abuts the roller 38 to change the trajectory thereof, whereby the state of the hands 30 is changed into the non-grasping state. Additionally, an angle between an inside surface of the groove 18 and the guide surface 81a is obtuse.

Figure 26C:
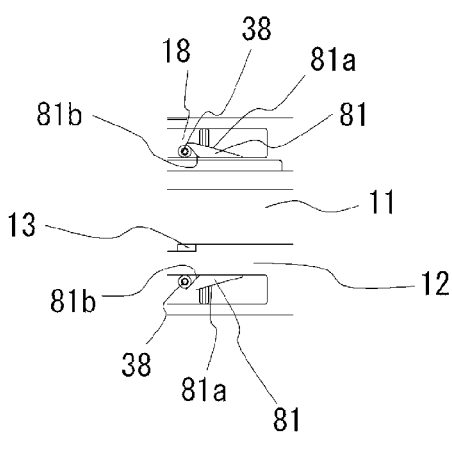
Figure 26D:
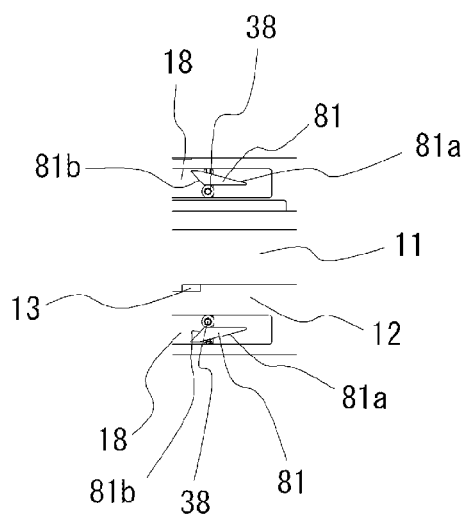

FIGS. 26C and 26D illustrate the trajectories of the rollers 38 when the housing 20 moves from the front end position toward the rear end position in the grasping state. The roller 38 moves along the inside of the groove 18 as illustrated in FIG. 26C to abut an escape surface 81b of the release body 81. An angle between the inside surface of the groove 18 and the escape surface 81b is acute. When the roller 38 further retreats from the state illustrated in FIG. 26C, the release body 81 is moved outwardly against the biasing force of the spring 8s by the roller 38 as illustrated in FIG. 26D. The roller 38 further retreats in this state. When the roller 38 moves away from the release body 81, the release body 81 is returned to its original position again by the biasing force of the spring 8s. In this manner, the release body 81 is biased to be capable of receding from the roller 38 without changing the trajectory thereof while the housing 20 is retreating.

The above embodiment has described an example of the robot hand where the object to be grasped is a storage medium. However, the object to be grasped is not limited to this.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the sprit and scope of the invention.

What is claimed is:
1. A robot hand comprising:
a drive source;
a baseboard;
a housing that is capable of advancing and retreating on the baseboard by means of the drive source;
a pair of hands that are provided to grasp an object and held by the housing;
an operation body that is provided to be capable of being pushed by the object and is held by the housing; and
a close mechanism that changes a state of the hands from a non-grasping state where the hands release the object into a grasping state where the hands grasp the object, in response to pushing of the operation body, and that is held by the housing, wherein the close mechanism comprises:
- a biasing portion that biases the hands to be in the grasping state; and
- a restriction portion that is movable between a restricted position and a released position, the restricted position where the restriction portion restricts the hands to the non-grasping state against a biasing force of the biasing portion, the released position where the restriction portion releases the hands, wherein the operation portion is pushed by the object to push the restriction portion from the restricted position to the released position, and wherein the close mechanism comprises a transmission body that transmits a movement of the operation body to the restriction portion or escapes the movement of the operation body without transmitting the movement of the operation body to the restriction portion, in response to a positional relationship between the operation body and the transmission body.

2. The robot hand of claim 1,
wherein the operation body comprises:
- a body portion; and
- a flange portion that is provided in the body portion, and wherein the transmission body slides relative to the baseboard in response to a movement of the housing, and comprises a through-hole through which the body portion of the operation body penetrates and through which the flange portion being permitted to pass or restricted from passing in response to a positional relationship between the operation body and the transmission body.

3. The robot hand of claim 2, wherein the through-hole comprises:
- an enlarged portion that permits the flange portion to pass through the through-hole; and
- a reduced portion that restricts the flange portion from passing through the through-hole.

4. The robot hand of claim 1, wherein the baseboard comprises a sliding surface over which the transmission body slides and which includes a difference in height so as to change the positional relationship between the transmission body and the operation body.

5. The robot hand of claim 1, further comprising release bodies that respectively abut the hands such that the hands are changed into the non-grasping state while the housing is advancing in the grasping state.

6. The robot hand of claim 5,
wherein the hand comprises a driven portion that projects to an outside of the housing, and
wherein the release body that abuts the driven portion to change a position of the driven portion whereby the hands are changed into the non-grasping state.

7. The robot hand of claim 6, wherein the release body is biased on a trajectory on which the driven portion passes in the grasping state, and is capable of receding from the driven portion, without changing the trajectory of the driven portion while the housing is retreating in the grasping state.

8. A library device comprising a robot hand, the robot hand comprising:
- a drive source;
- a baseboard;
- a housing that is capable of advancing and retreating on the baseboard by means of the drive source;
- a pair of hands that are provided to grasp an object and held by the housing;
- an operation body that is provided to be capable of being pushed by the object and is held by the housing; and
- a close mechanism that changes a state of the hands from a non-grasping state where the hands release the object into a grasping state where the hands grasp the object, in response to pushing of the operation body, and that is held by the housing, wherein the close mechanism comprises:
- a biasing portion that biases the hands to be in the grasping state; and
- a restriction portion that is movable between a restricted position and a released position, the restricted position where the restriction portion restricts the hands to the non-grasping state against a biasing force of the biasing portion, the released position where the restriction portion releases the hands, wherein the operation portion is pushed by the object to push the restriction portion from the restricted position to the released position, and wherein the close mechanism comprises a transmission body that transmits a movement of the operation body to the restriction portion or escapes the movement of the operation body without transmitting the movement of the operation body to the restriction portion, in response to a positional relationship between the operation body and the transmission body.

* * * * *